Figure 1:
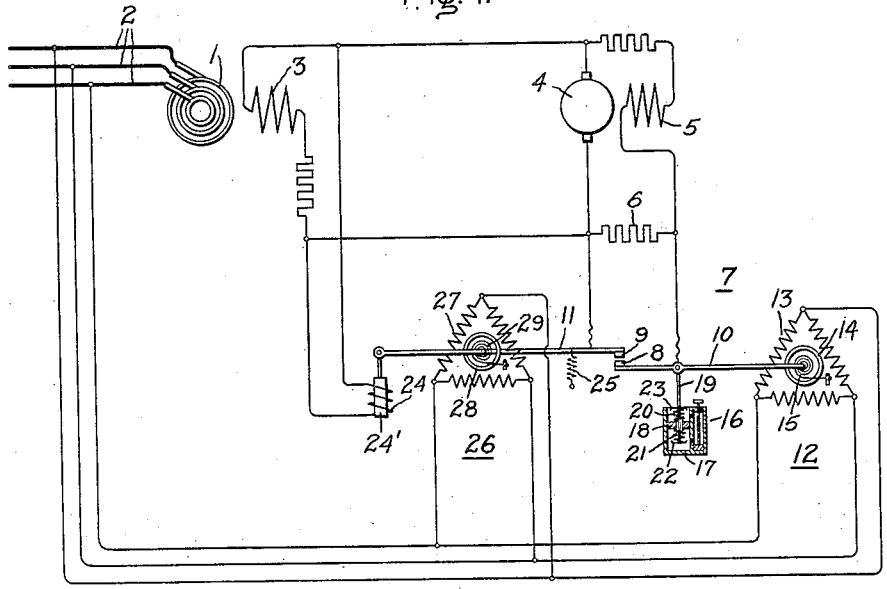

Jan. 14, 1930. R. H. PARK 1,743,798

ELECTRICAL REGULATOR

Original Filed Aug. 31, 1927

Inventor:
Robert H. Park,
by
His Attorney.

Patented Jan. 14, 1930

1,743,798

UNITED STATES PATENT OFFICE

ROBERT H. PARK, OF SCOTIA, NEW YORK, ASSIGNOR TO GENERAL ELECTRIC COMPANY, A CORPORATION OF NEW YORK

ELECTRICAL REGULATOR

Application filed August 31, 1927, Serial No. 216,687. Renewed May 29, 1929.

My invention relates to electrical regulators and systems of regulation and finds particular application in the regulation of the synchronous equipment of polyphase power transmission systems.

With the extension of power transmission systems by interconnection and the extension of transmission lines to greater distances the problem of maintaining service and increasing stability of operation has received increased attention in recent years. The problem of stability involves a consideration of voltage change with load change and this naturally directs attention to the regulators and systems of regulation of the generators and auxiliary units of the system.

It has been the usual practice heretofore to energize the regulator of a polyphase generator from one phase of a polyphase system which is to be controlled. With this arrangement the regulator does not receive a true indication of the excitation requirements to maintain synchronism between synchronous machines of the system unless the phase voltages are substantially balanced. For example, in case of a single phase short circuit or similar condition causing marked unbalance in the polyphase system, it is usually necessary to increase the field excitation of the synchronous machines of the system in order to maintain synchronism. If the regulator coil is connected to the short circuited phase increased excitation will be effected since the voltage on this phase will approach zero. However, if the single regulator coil does not happen to be connected to the short-circuited phase, the voltage on the other phases may increase so that the regulator decreases the excitation thereby rendering the system susceptible to conditions of instability. In order to ensure greater reliability of service and increased stability of operation, particularly under conditions causing marked unbalance of voltage or current, as, for example upon the occurrence of single phase short circuits, it is desirable to energize the regulator in a manner to change the excitation in the proper direction to maintain synchronism under all practical operating conditions irrespectively of whether the system is balanced or unbalanced.

During the last ten years various articles have appeared in the literature which point out that any unbalanced polyphase system of electrical quantities may be resolved into two or more balanced or symmetrical systems; for example, that a three phase system comprising three unequal vectors may be resolved into three sets of components, two of which consist of balanced three phase vectors and the third of which comprises three vectors equal and in phase. The three systems of vectors are known as the positive phase sequence components, the negative phase sequence components, and the zero phase sequence components.

In accordance with the above-mentioned theory it has been proposed heretofore to energize a regulator in accordance with one symmetrical phase sequence component of an unbalanced system by interposing a segregating sequence network between the regulated system and the regulator. Such a sequence net work for regulator use is usually arranged to impress on the regulator coil a voltage proportional to the positive sequence voltage at the generator terminals. This arrangement changes the excitation in the proper direction under balanced or unbalanced conditions, but I have found that a greater change than that obtained with only the positive sequence component is desirable under conditions of unbalance in order to decrease the susceptibility to loss of synchronism between synchronous machines of the system, particularly under conditions of phase-to-phase short circuit or a fault between a line wire and ground, and in accordance with my invention I provide means whereby the excitation is changed in proportion to a quantity which is less than the positive sequence component of voltage.

An object of my invention is to provide a new and improved regulator and system of regulation which will effect proper regulator action when utilized in connection with a polyphase circuit and a polyphase dynamo-electric machine irrespectively of whether the electrical conditions are the same or different in each phase.

Another object of my invention is to provide a new and improved regulator which will function in accordance with the difference between the squares of the magnitudes of two symmetrical phase sequence components of an electrical quantity of the circuit to which the regulator is connected.

A further object of my invention is to provide a new and improved regulator which will function in accordance with the difference between the squares of the magnitudes of the positive and negative phase sequence components of an electrical quantity of the circuit to which the regulator is connected.

The novel features which I believe to be characteristic of my invention are set forth with particularity in the appended claims. The invention itself, however, both as to organization and method of operation together with further objects and advantages thereof will best be undestood by reference to the following description taken in connection with the accompanying drawing in which Fig. 1 is a diagrammatic representation of the regulator and system of regulation embodying my invention, and Fig. 2 is a detailed section view of one of the actuating elements of the regulator.

Figure 2:
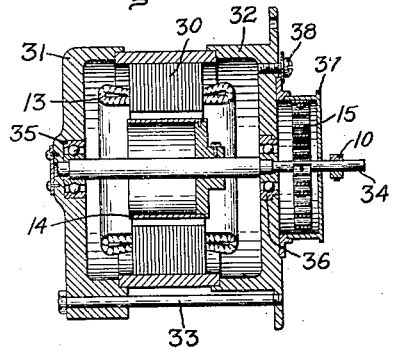

In Fig. 1 of the drawing an embodiment of my invention is shown in the excitation circuit of a synchronous dynamo-electric machine diagrammatically represented by a three phase alternator 1 which is connected to a distribution circuit 2. The alternator 1 is provided with a field winding 3 which is supplied with exciting current from a source of direct current shown as a dynamo-electric machine or exciter 4 which is provided with a shunt connected field winding 5. A resistor 6 which is adapted to be periodically shunted by the operation of the cooperating contacts of the regulator 7 is placed in series with the field winding 5. Regulator 7 as here shown is of the Tirrill type but it is to be understood that my invention may be embodied in other types of vibratory regulators, and also in other types of regulators in which the regulation is accomplished by varying the mean effective excitation of a dynamo-electric machine in order to maintain an electrical characteristic of the dynamo-electric machine at a predetermined value under various operating conditions.

Regulator 7 in the form shown comprises two main contacts 8 and 9 which are connected across the resistor 6 and mounted on contact arms or levers 10 and 11, respectively. For simplicity of illustration these contacts are shown as operating directly across the resistor 6 but the use of the well-known intermediate relay or any other type of suitable relay which is controlled by these primary contacts will occur to those skilled in the art and may be used if preferred. The lever 10 instead of being actuated by the usual solenoid energized from one phase of the regulated circuit is actuated by a dynamo-electric device 12 which comprises a stationary polyphase primary or inducing winding 13 for producing a rotating magnetic field and a rotatable closed circuited secondary or induced member 14. The winding 13 is connected to be energized from all of the phases of circuit 2. The rotatable member 14 is mechanically connected to actuate lever 10 and forms a pivot for this lever. The torque of the rotatable member 14 under predetermined normal conditions in circuit 2 is counter-balanced by the torque of a spring 15, but other means such as a weight will occur to those skilled in the art and may be used if preferred. In the preferred embodiment of my invention the device 12 is essentially an induction motor operating as a torque motor and is described in more detail hereinafter.

The motion of lever 10 is modified by damping means shown as a dashpot 16. Preferably the lever 10 should be permitted to move quickly to a new position for any change in the regulated characteristic of circuit 2 but the motion should be damped after the initial movement in order to prevent hunting. This quick initial movement followed by a subsequent damping action can be obtained by placing a resilient connection between the damping means and the lever. An embodiment of such an arrangement is shown by the form of dashpot shown in the drawing which comprises a cylindrical casing 17, a piston 18 therein, and a shaft 19 slidably extending through said piston and resiliently connected thereto by springs 20 and 21 which bear on opposite sides of the piston and are forced into engagement therewith by retaining members 22 and 23 secured to said shaft on opposite sides of the piston.

The lever 11 is actuated by an electromagnetic means comprising a solenoid 24 and a plunger 24' which is mechanically connected to the lever at a point removed from the contact end. The solenoid 24 is arranged to be energized in accordance with an electrical characteristic of the alternator field circuit and as shown is connected to be responsive to the voltage of the exciter. A spring 25 is connected to the lever 11 near the contact end and is arranged to oppose the full of the solenoid 24. The lever 11 is also actuated by a dynamo-electric device 26 similar in essential details to the dynamo-electric device 12 and comprises a stationary polyphase primary or inducing winding 27 and a rotatable secondary or induced member 28. The winding 27 is connected to be energized from all phases of circuit 2. The lever 11 is mounted on the rotatable member 28 and its bearings act as a pivot for this lever. The additional alternating current excitation utilized in the actuation of lever 11 is to make the regulator more rapidly responsive to changes in the characteristic regulated by changing the relative position of the main contacts independently of the operation of lever 10 when the regulated characteristic departs from the predetermined normal value. This feature of imposing composite excitation from the regulated circuit and the excitation circuit on the vibratory element of the regulator is described and claimed in an application of Clifford A. Nickle, Serial No. 150,608 filed November 24, 1926, and assigned to the same assignee as this application.

In Fig. 2 I have shown an embodiment of the dynamo-electric devices 12 and 26 in some detail and have retained the same numerals that have been used to designate corresponding parts of device 12 in Fig. 1. These devices as shown are essentially polyphase induction motors consisting of a primary structure and a secondary structure. The primary structure comprises a laminated stator core member 30 supporting the coils 13 symmetrically on its inner periphery in the usual manner of a polyphase distributed winding. The stator core member 30 is clamped between end frame members 31 and 32 by through-bolts 33. The secondary rotatable structure comprises a closed circuited rotor member adapted to have currents induced therein and is mounted on a shaft 34 which is supported by suitable bearings 35 and 36 in the end frame members 31 and 32, respectively. This rotor member may be constructed in the form of the usual squirrel-cage induction motor rotor, or some modification thereof, but preferably it consists of a hollow steel shell, as shown. This type of construction provides a member having small inertia and desirable torque characteristics and eliminates any difficulty due to irregular torque characteristics obtained with spaced conducting bars. A spring casing member 37 adjustably secured to the frame member 32 encloses a coil spring 15 which has one end secured to the casing member 37 and the other end secured to the rotor shaft 34. A screw 38 is arranged to permit the casing member to be rotated about its axis until the tension of the spring 15 counter-balances the torque of the member when the stator winding is energized under predetermined normal conditions. The lever 10 shown in cross section is suitably secured to the extension of shaft 34. In a similar manner the lever 11 is secured to the shaft of the device 26.

The complete cycle of operation for the arrangement shown in Fig. 1 is substantially as follows: First assume a fixed position of contact 8 and lever 10. If the exciter voltage is initially zero the pull of coil 24 will be zero and the spring 25 having no opposition will close contacts 8 and 9 shorting out resistor 6 in the exciter field circuit. This will cause the exciter voltage to build up gradually so that the pull of coil 24 increases. After a certain time the exciter voltage will become great enough to make the pull of coil 24 greater than the pull of spring 25 thereby opening the contacts. This inserts resistance 6 in the exciter field circuit and the exciter voltage starts to fall. When it has fallen to a certain value the pull of coil 24 is again less than the pull of spring 25 and the contacts close again. They will remain closed until the pull of coil 8 is again greater than the pull of spring 25. Thus for a fixed position of lever 10 the exciter voltage will periodically vary between two values and a certain average value will be obtained.

The average exciter voltage thus held will cause a certain voltage to exist at the alternator terminals. If this exciter voltage is of the proper value to cause the torque of rotor 14 to balance the opposing torque of spring 15, contact 8 will stay in the assumed position and the operation will continue in the manner hereinbefore described. Under balanced voltage conditions in circuit 2 the polyphase currents in the primary winding 13 of device 12 produce a revolving field which induces currents to flow in the rotatable member 14. These induced currents react on the revolving magnetic flux in such a way as to tend to drag the secondary member 14 along with the rotating flux. The torque received by the rotatable member 14 is delivered at the shaft 34 and is balanced by the spring 15 when the voltage of the line is at the predetermined normal value. This torque is proportional to the square of the phase voltage or the line-to-line voltage of the motor. If the voltage of the circuit 2 increases the torque of the rotor will exceed the counter-balancing torque of the spring 15 and the lever arm 10 will tend to move in a counter-clockwise direction to lower the contact 8 and thereby decrease the time during which resistor 6 is short circuited. On the other hand, if the voltage decreases the torque of the rotor will be less than the counter-balancing torque of the spring 15 and the lever arm 10 will tend to move in a clockwise direction to raise the contact 8 and thereby increase the time during which resistor 6 is short circuited. The action of the regulator under these conditions will be similar to the usual solenoid operated regulator.

Under unbalanced voltage conditions the phase voltage or the line-to-line voltage of the motor will contain specific, symmetrical, positive and negative phase sequence components but the torque of the rotor will be proportional to the difference between the squares of the magnitudes of the positive phase sequence component and the negative phase component. If this resultant torque of the rotor is less than the counter-balancing torque of the spring 15, the lever 10 will move in a clockwise direction to raise contact 8, and conversely if the resultant torque of the rotor is greater than the counter-balancing torque of the spring 15, the lever 10 will move in a counter-clockwise direction to lower the contact 8. This change in the position of contact 8 is effected promptly and effects a disproportionate increase or decrease in the field excitation which ensures that the rate of change of voltage will be greater than the rate of change of load thereby ensuring greater stability of operation particularly when operating near the maximum power limit of the system.

In the arrangement shown in connection with lever 11, under balanced normal voltage conditions in circuit 2, the action between solenoid 24 and spring 25 will be the same as the usual arrangement of the Tirrill type of regulator because the torque motor 26 will not have any substantial effect on the action of the lever. However, if the alternator voltage falls below the predetermined normal value the counter-balancing torque of the spring 29 will exceed the torque of the rotor 28 and the total pull opposing the pull of solenoid 24 will consist of the pull of spring 29 and spring 25. This will snap the contacts closed and keep them closed until the exciting voltage builds up to the new average value necessary to bring the alternator voltage back to normal. Unbalanced voltage conditions in circuit 2 will cause a similar action of the regulator if the torque of rotor 28 due to the difference between the squares of the magnitudes of the positive sequence voltage component and the negative sequence voltage component is less than the counter-balancing torque of the spring 29.

While I have shown and described a particular embodiment of my invention, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:—

1. In combination, a polyphase alternating current circuit, regulating means comprising cooperating contacts for controlling an electrical characteristic of said circuit, means for vibrating one of said contacts, and a polyphase dynamo-electric device connected to be responsive to an electrical characteristic of said circuit for actuating the other of said contacts.

2. In combination, a polyphase alternating current circuit, regulating means comprising cooperating contacts for controlling an electrical characteristic of said circuit, means for vibrating one of said contacts, and means for controlling the relative position of said contacts comprising primary means connected to said circuit for producing a rotating magnetic field and a closed circuit secondary member cooperating therewith and connected to the other of said contacts.

3. An electrical regulator comprising cooperating contact members, means for effecting a vibratory movement of one of said contact members, and dynamo-electric means including a rotatable member biased to a predetermined position for varying the position of the other of said contact members.

4. An electrical regulator comprising cooperating contact members, means for effecting a vibratory movement of one of said contact members, and a polyphase torque motor for varying the position of the other of said contact members.

5. An electrical regulator comprising cooperating contact members, means comprising an electromagnetic device and a dynamo electric device for actuating one of said contact members, and means comprising a dynamo electric device for varying the relative position of said contact members.

6. An electrical regulator, a movable member, a contact mounted thereupon, another contact adapted for engaging said first mentioned contact, and dynamo electric means comprising a polyphase primary winding and a closed circuit secondary member for actuating said movable member, and means for imparting vibratory motion to said second contact.

7. An electrical regulator comprising a pair of cooperating contacts, levers for actuating said contacts, electromagnetic means for imparting vibratory motion to one of said levers, dynamo electric means comprising a polyphase primary winding and a closed circuit secondary member for modifying the action of said electromagnetic means under predetermined conditions of energization of said primary winding, and dynamo electric means comprising a polyphase winding and a closed circuit secondary member connected to the other of said levers for carying the relative position of said contacts.

8. An electrical regulator comprising cooperating contact members, means comprising an electromagnetic device and a polyphase torque motor for actuating one of said contact members, and means comprising a polyphase torque motor for varying the relative position of said contact members.

9. The combination with a dynamo-electric machine, an excitation circuit therefor, a lever system having cooperating contacts for controlling said excitation circuit, an electromagnet responsive to an electrical characteristic of said excitation circuit and dynamo-electric means responsive to an electrical characteristic of said dynamo-electric machine and cooperating with said electromagnet for actuating one contact of said lever system, and dynamo-electric means responsive to an electrical characteristic of said dynamo-electric machine for actuating the other contact of said lever system.

10. The combination with a polyphase synchronous alternating current machine, an excitation circuit therefor, a lever system having cooperating contacts for controlling said excitation circuit, an electromagnet responsive to the voltage of said excitation circuit for actuating one contact of said lever system, and dynamo-electric means responsive to the voltage of said synchronous machine for actuating the other contact of said lever system in accordance with the difference between the squares of the magnitudes of two components of a polyphase electrical quantity of said alternating current machine.

11. In a regulating system, a polyphase synchronous alternating current machine, an exciter therefor, a pair of cooperating contacts arranged to control by their engagement and disengagement the excitation of said exciter, means for effecting vibratory action between said contacts, polyphase dynamo-electric means responsive to an electrical characteristic of said alternating current machine for controlling the relative position of said contacts, and a second polyphase dynamo-electric machine for controlling under predetermined conditions the relative position of said contacts independently of the position effected by said first mentioned dynamo-electric means.

12. In a regulating system, a synchronous polyphase alternating current machine, an exciter therefor, a pair of cooperating contacts arranged to effect by their engagement an increase in the excitation of said exciter and by their disengagement a decrease in the excitation of said exciter, a winding responsive to the voltage of said exciter for effecting vibratory action between said contacts, a torque motor responsive to the voltage of said synchronous machine for controlling the relative position of said contacts, and a second torque motor responsive to the voltage of said synchronous machine for effecting a change in the relative position of said contacts independently of the relative position effected by said first mentioned torque motor.

In witness whereof, I have hereunto set my hand this 30th day of August, 1927.

ROBERT H. PARK.

CERTIFICATE OF CORRECTION.

Patent No. 1,743,798.  Granted January 14, 1930, to

ROBERT H. PARK.

It is hereby certified that error appears in the printed specification of the above numbered patent requiring correction as follows: Page 2, line 129 for the word "full" read "pull"; page 4, line 121, claim 7, for "carying" read "varying"; and that the said Letters Patent should be read with these corrections therein that the same may conform to the record of the case in the Patent Office.

Signed and sealed this 4th day of March, A. D. 1930.

(Seal)

M. J. Moore,
Acting Commissioner of Patents.